March 10, 1942.  E. P. SUNDHOLM  2,275,477
FLOW CONTROL DEVICE
Filed Nov. 9, 1939  2 Sheets-Sheet 1
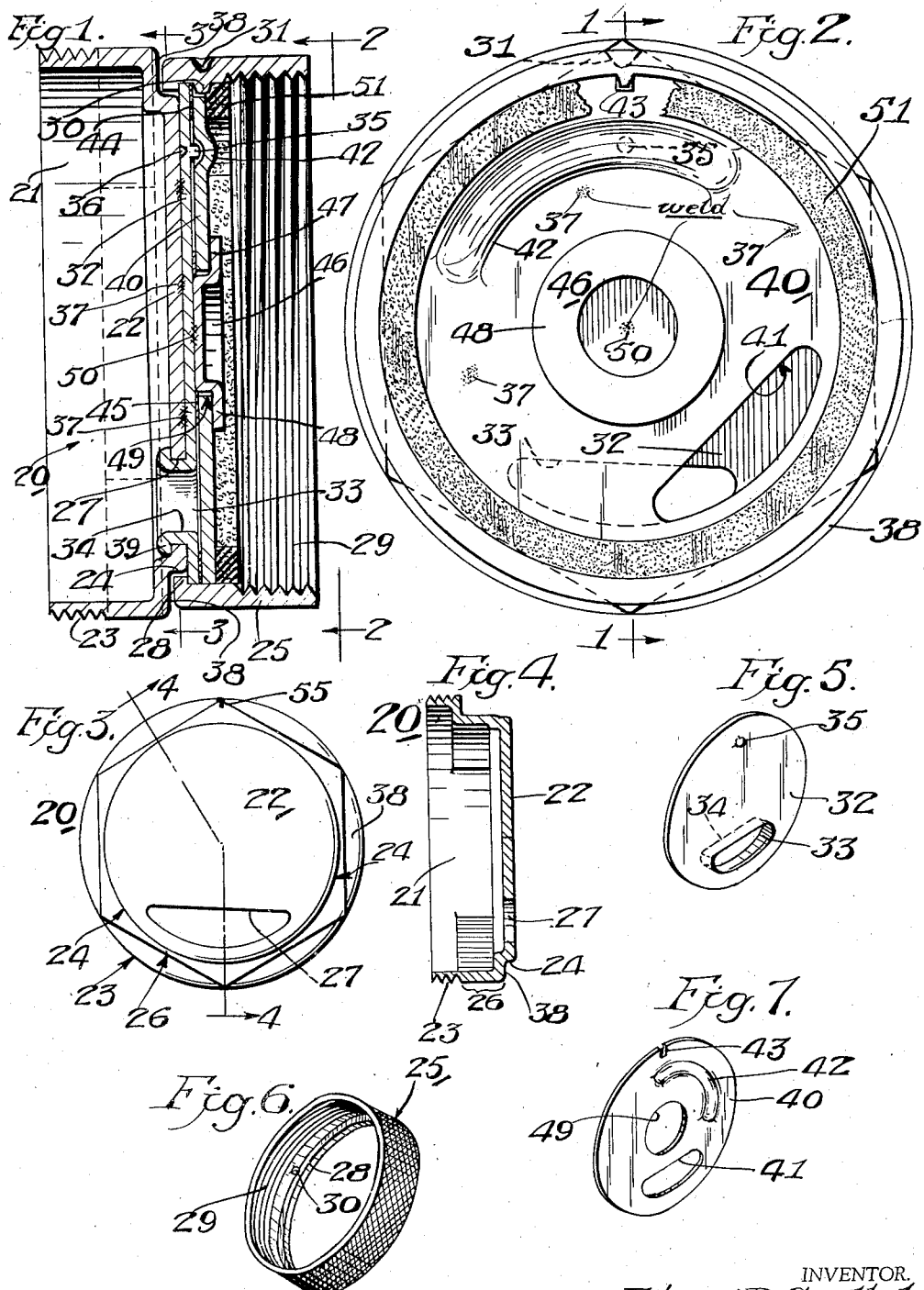
INVENTOR.
Edwin P. Sundholm
BY Leonard L. Kalish
ATTORNEY.

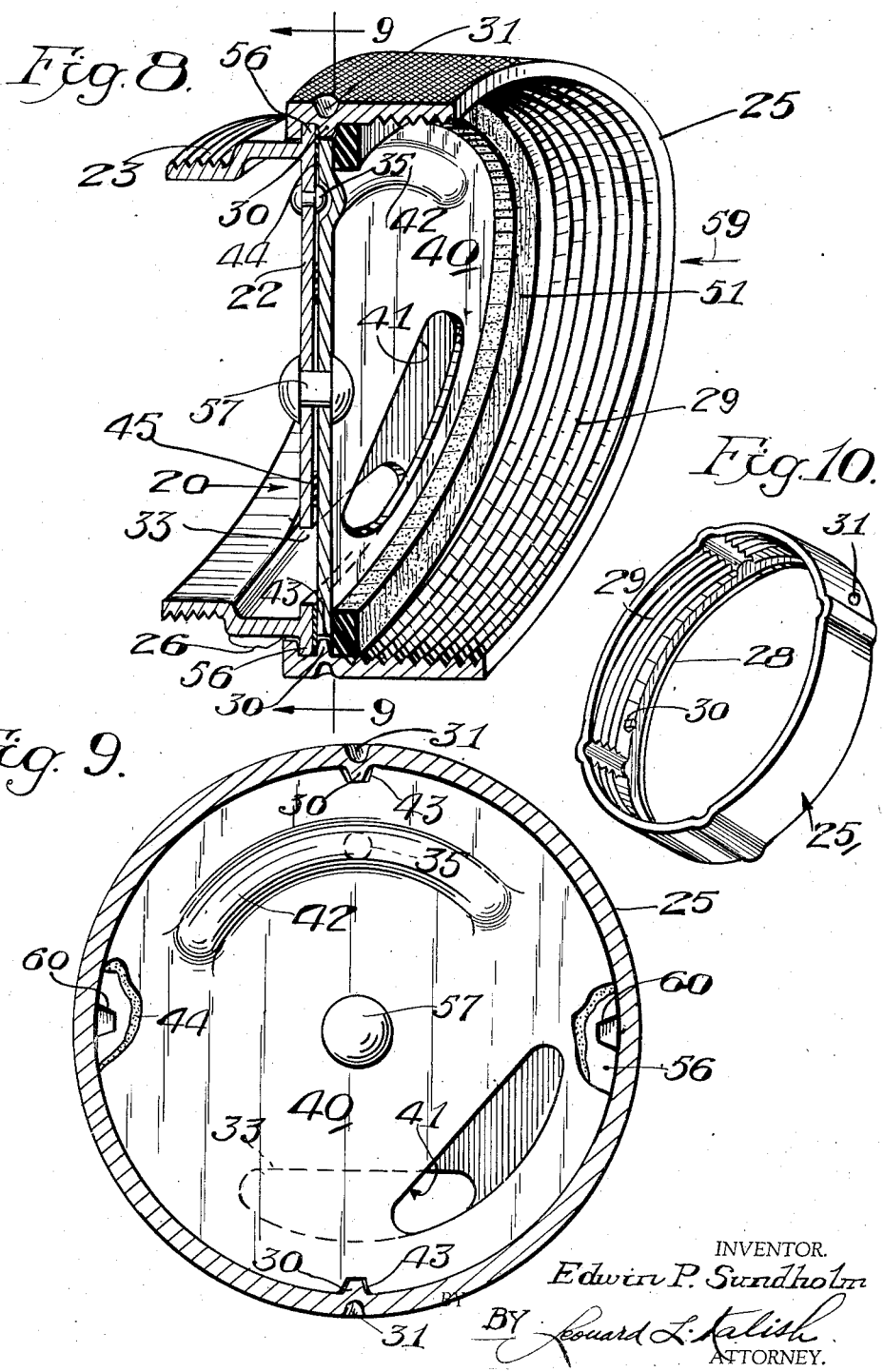

Patented Mar. 10, 1942

2,275,477

UNITED STATES PATENT OFFICE 2,275,477

FLOW CONTROL DEVICE

Edwin P. Sundholm, Albert City, Iowa

Application November 9, 1939, Serial No. 303,656

5 Claims. (Cl. 284—14)

The present invention relates to a certain new and useful flow-control device adapted for use in conjunction with fluid containers and reservoirs, as for instance sheet-metal tanks, drums, containers or the like, or any other tanks, drums, containers or the like, whereby fractional portions of the fluid contents of the container may be more effectively and more conveniently withdrawn from time to time into any suitable tubular receiving member into which the contents of the container is to be dispensed.

In discharging the fluid contents of a container, either at one time or by successive periodic discharges of fractional portions of the contents, it is often desirable not to permit the discharged fluid to come into open contact with the outside air after it leaves the container, but instead to discharge it directly into any vessel, such as a pipe, tube or the like, or through a pipe, tube or the like, which is connected to the discharge opening of the container. In such instances it is therefore necessary first to un-plug the discharge opening of the container by removing the usual conventional screw plug, for instance, and then to secure or otherwise fasten into the discharge opening (in place of the plug), the pipe, tube, or other member into or through which the fluid contents is to be discharged. In such instances it is a matter of some concern to get the tubular receiving member into operative connection with the discharge opening of the container after the closure plug has been removed therefrom, without spilling any of the fluid between the interval that the plug is removed and the tubular receiving member connected to the discharge opening.

The object of the present invention is to provide a flow-control device which may be used in place of the conventional closure plug in the discharge opening of a fluid container, and which is adapted to receive, and, if desired, to make coupled connection with any suitable tubular receiving member and which is adapted to control the flow of fluid thereto by rotary motion about an axis generally coincident with the axis of the container opening, and which rotary motion may be induced by the rotation of the tubular receiving member during the act of coupling and uncoupling of such tubular receiving member in relation to the flow-control device.

With the above and other objects in view, which will appear more fully from the following detailed description, the present invention consists of a certain flow-control device including a generally tubular portion adapted for detachable and fluid-sealing engagement within the discharge opening of any conventional container, and a second tubular portion coaxial with the first tubular portion and rotatably connected therewith, and adapted detachably to receive and to make quick-detachable connection with a tubular receiving member, fluid-conducting passageways through each of said tubular members communicable with each other, and shut-off means operable by the relative rotary motion of said tubular portions about their common axis for opening and closing, at will, said fluid passageway between said two tubular portions.

The present invention further consists of other novel features, as well as certain novel details of construction, all of which will appear more fully from the following detailed description and accompanying drawings.

In the accompanying drawings, in which like reference characters indicate like parts, Figure 1 represents an axial cross-sectional view of a flow-control device representing one embodiment of the present invention, taken generally on line 1—1 of Figure 2;

Figure 2 represents an end elevational view of the same, as viewed generally on line 2—2 of Figure 1;

Figure 3 represents an end elevational view (generally on line 3—3 of Figure 1), of the relatively stationary tubular portion of the flow-control device of the present invention, which is adapted to be secured in the discharge opening of the container, which in this figure is shown on a scale smaller than that on which Figures 1 and 2 are represented;

Figure 4 represents a section on line 4—4 of Figure 3;

Figure 5 represents a perspective view of the base plate 32 which forms a part of the flow-control device illustrated in Figures 1 and 2;

Figure 6 represents a perspective view of the relatively rotatable ring-like tubular member 25, forming part of the flow-control device illustrated in Figures 1 and 2; and Figure 7 represents a perspective view of the rotatable shut-off disc 40, forming part of the flow-control device shown in Figures 1 and 2.

Figure 8 represents a perspective cross-sectional view of a modified form of construction embodying the present invention.

Figure 9 represents an end elevational view of the same.

Figure 10 represents a perspective view of a modified form of socket-ring 25.

In the embodiment of the invention shown in Figures 1 to 7 of the drawings, a generally cup-like stationary member 20 is provided having a generally cylindrical portion 21 and a generally flat terminal wall 22. The free end of the generally cylindrical portion 21 may be threaded externally as at 23 with any suitable thread corresponding to the thread in the bung-hole or in the bung-bushing of the conventional steel barrel, drum or tank or other container. The flat terminal wall 22 is preferably surrounded by a stepped-in slight cylindrical portion 24 which is adapted to act as a centering trunnion-like element in relation to the rotatable ring-like tubular socket member 25. Intermediate the cylindrical trunnion portion 24 and the threaded portion 23 a gripping portion 26 may be provided by which the generally stationary plug member 20 may be gripped from without, as, for instance, by a wrench, spanner wrench, or the like. The gripping portion 26 may be formed in any suitable polygonal shape as for instance, in the hexagonal shape indicated in the drawings.

A generally elongated opening 27 is provided in the terminal wall 22.

The relatively rotatable ring-like tubular socket-member 25 is provided with a slight inturned terminal flange 28, and may be internally threaded as at 29 to receive any externally threaded tubular member into which the steel drum, barrel, tank or other container is to be discharged from time to time. The member 25 instead of being threaded internally as indicated in the drawings may be threaded externally or may be provided with a bayonet catch instead of a screw-thread or any other connecting means.

At a point spaced slightly from the inturned flange 28, an inward radial projection or lug 30 is provided in the ring 25 as for instance, by indenting or pressing the side wall of the ring inwardly as at 31 while the ring is supported from within by a die having a suitable depression corresponding to the desired shape of the lug 30, thereby forcing the metal into the depression and forming the lug 30 integrally with the ring 25.

Between the inturned flange 28 and the lug 30, a base plate 32 is positioned with just sufficient clearance to permit relative rotation between the ring 25 and base plate 32. The base plate 32 may be inserted into the ring by inserting one edge of the ring beneath the lug 30 while the plate 32 is held at an angle and then permitting the rest of the plate to set against the flange 28.

The base plate 32 is provided with a port opening 33 of the same general contour as the hole 27 in the member 20 but slightly smaller and is also provided with a crimping flange or sealing flange or bushing 34 drawn from the metal of the plate and having the same general cross-section as at opening 27.

The plate 32 may also be provided with a stop lug 35 pressed outwardly therefrom at a suitable point, by the same method used for the production of the lug 30, as by indenting the metal from the opposite side as at 36.

The base plate 32, surrounded by the ring 25, is then applied to the stationary cup-like member 20 by inserting the generally tubular grommet-like bushing 34 thereof through the opening 27 and by spot-welding, soldering or riveting the base plate 32 to the terminal wall 22 at a suitable number of points as for instance, at the spots 37, thereby firmly to unite the base plate to the terminal wall 22. By this union, the ring 25 is held in place against axial displacement, because the inturned flange 28 thereof will be disposed between the shoulder 38 and the peripheral portion of the base plate 32 which overhangs or extends beyond the trunnion portion 24 and the stationary cup-like plug member 20 (with just enough clearance to permit free rotation of the ring 25 in relation to the relatively stationary cup-like plug member 20).

Thereafter, the generally tubular grommet-like bushing 34, drawn from the base plate 32, is flared over on the inside of the terminal wall 22 as indicated at 39 and pressed tightly in place so as to form a fluid-tight seal against the back of the wall 22.

A shut-off disc 40 having a port opening 41 corresponding to the port opening 33 is provided with an arcuate raised channel 42 of an arcuate extent slightly greater than the arcuate extent of the ports 33 and 41 and so disposed in relation to the port 41 and the stop lug 35, that the lug 35 will project into it and will act as a stop to limit the rotary motion of the shut-off disc 40 to the open and closed position.

The shut-off disc 40 is also provided with a notch 43 at a suitable point in the periphery thereof, to receive the lug 30, thereby to form an interlocking connection between the ring 25 and the shut-off disc 40, thereby to cause the disc 40 to rotate in unison with the ring 25. A thin annular sealing gasket 44 of any suitable thin gasket material may be interposed between the base plate 32 and the shut-off disc 40 at a radius outside the ports 33 and 41. If desired, a similar sealing gasket may also be interposed between the base place 32 and the shut-off disc 40 at a radial distance inwardly from the radial distance of the ports 33 and 41 as for instance at the point 45. If desired, this second annular sealing gasket may be placed instead between the shut-off disc 40 and the flanged cup-like retainer disc 46 at the point 47 between the retaining flange 48 thereof.

The retainer member 46 extends through the opening 49 of the shut-off disc and is spot-welded to the base plate 32 as at 50, thereby completing the permanent assembly of the device.

A sealing gasket 51 may be provided within the socket ring 25 for sealing against the end of any tubular receiving member which may be screwed into the socket 25 for receiving the fluid contents of the drum, barrel, tank or the like into the bung-hole of which the device may be mounted.

By so arranging the screw thread 29 or the bayonet catch or other fastening means associated with the ring 25, and the relative disposition of the ports 33 and 41 and stop 35, that the coupling of any tubular receiving member to the socket 25 involves a rotary motion in the direction in which the shut-off disc 40 is turned to the open position and so that the uncoupling of any tubular receiving member from the socket 25 involves a rotary motion in the direction in which the shut-off disc 40 is turned to the closed position, the entire flow control device may be operated by the mere insertion and removal of the tubular receiving member (such as a pipe or pipe-fitting or like member). Thus, when inserting the tubular receiving member into the socket 25 by a rotary motion in the clock-wise direction, the friction between it and the ring 25 is sufficient to rotate the ring until it is rotated into the open position while the uncoupling of the same tubular receiving member will turn the ring to the closed position. If the initial friction between the ring 25 and the receiving member is not sufficient then a continued rotation of the tubular receiving member after it has contacted the sealing gasket 51 will be sufficient to cause a rotation of the ring.

It will be noticed that when the flow control device is not discharging, that is, when it is in the closed position on the drum to which it is attached, any conventional closure plug 53 may be inserted into the socket ring 25 thereby more securely to seal the barrel, drum or tank against leakage of fluid.

It should be noticed that whether the tubular receiving member 54 or whether the closure plug 53 is screwed tightly into the socket ring 25, the pressure of either of these members against the sealing gasket 55 is transmitted to the shut-off disc 40 which is thereby pressed more firmly against the base plate 32 or against the sealing gaskets 44 and/or 45 intervening the same, thereby to intensify the fluid-seal between the stationary base plate 32 and the rotary shut-off disc 40, so as further to guard against possible leakage of fluid while the barrel, drum or tank is standing idle or while it is in storage or in transit.

It will also be noticed that because of the union of the base plate 32 with the terminal wall 22 by a spot-welding or the like, the strain to resist dislodgement of these two members in relation to each other is not borne by the generally tubular grommet-like sealing bushing 34 which is thereby enabled more surely to retain a fluid seal.

The stationary cup-like member 20 as well as the socket-ring 25 is preferably drawn out of or formed of flat sheet metal such as sheet steel of suitable thickness according to the size of the device and the use to which it is to be put, and so the other parts are likewise preferably pressed or drawn out of sheet metal such as sheet steel or the like. The socket member 25 may be formed of a metal tube cut to the desired length with one end flanged or flared inwardly to produce the inturned flange 28 and the other end threaded as at 29.

The member 20 (and also the ring 25) may also be otherwise formed as for instance, of castings such as die castings, or may be cold drawn of suitable metals by suitable die drawing or cold flowing operations.

Any suitable mark such as the mark 55 may be provided at a point diametrically opposed to the radial center line of the opening 27, to indicate the part of the plug member 20 which should be turned to the top when the plug is screwed into the bung hole of a barrel, drum, tank or the like, so that the opening 27 in the port 33 will be at the bottom, thereby enabling all of the liquid to be withdrawn.

In the modified form of construction shown in Figures 8 and 9, the base plate 32 may be eliminated by providing an overhanging radial flange 56 integrally with and as an extension of the terminal wall 22, to which the shut-off disc 40 may be pivoted, either in the manner indicated in the modifications shown in Figures 1 to 7 inclusive, or by riveting or other suitable pivotal means 57. In this modified form of construction the two or more radially inwardly projecting lugs 30 are provided, which not only serve to engage the shut-off disc 40 by interlocking with corresponding notches 43, but also serve to prevent the rotatable ring-like tubular socket-member 25 from being displaced axially in the direction of the arrow 59. In order to permit the ring 25 to be slipped over the flange 56, the flange 56 is in turn provided with a number of notches 60 in its periphery corresponding to the projections 30 in the ring 25, but so spaced that when the rotation of the ring 25 is limited by the stop lug 35, the lugs 30 can no longer come into registration with the notches 60, so that the ring 25 will be retained by the lugs 30 against axial displacement in the direction of the arrow 59, after the device is completely assembled.

The stationary member 20 in the form of construction illustrated in Figures 8 and 9 (as well as in the other forms of construction) may be either a casting of iron, brass, aluminum, or the like, or it may be a die-casting, that is, cast into a die with the molten metal forced in under substantially fluid pressure, or it may also be pressed out of sheet metal. The stop lug 35 may either be pressed out of the wall 22 or just cast integrally therewith, or it may indeed be superadded in the form of a small rivet, screw, pin, or the like, as for instance indicated in Figure 8.

As the friction between the socket 25 and the tubular receiving member which may be screwed into it may be insufficient to cause adequate rotation of the socket for turning the device on and off, the ring 25 may be gripped either manually or by any suitable tool, and for this purpose may be either knurled on the outside or it may be provided with a series of ribs or other irregularities on the outer surface to facilitate firmer gripping, either manually or otherwise, as indicated in Figure 10.

In the form of construction illustrated in Figures 1 to 7 inclusive, the base plate 32 may be secured to the end wall 22 by means other than spot-welding, as for instance by riveting or the like.

The stationary member 20 may also be welded or riveted to the drum or container, in which case the screw flange 23 may be replaced with a lateral flange suitable for spot-welding or arc-welding or riveting.

Instead of a single set of ports 33 and 41, several smaller sets of corresponding ports may be used. If more than one set of ports is used, they may be closely spaced or may be distributed around the circumference.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent, is:

1. A flow-control device adapted for use in bung-openings of barrels, drums, tanks or the like, comprising a generally cup-like plug member adapted to be secured in a bung-hole with its end-wall extending outwardly, a stationary base plate secured to said end-wall and having its peripheral zone clear of said plug member, a socket ring surrounding said base plate and pivotally related thereto and having an inturned locking flange extending behind the peripheral portion of the base plate and being confined between said peripheral portion and a portion of the plug member, against axial displacement, a passageway through said end-wall and through said base plate, a shut-off disc within said socket ring pivotally secured to said base plate and having connection with said socket ring to cause it to turn in unison therewith, said shut-off disc being adapted to open and close the aforesaid passageway by opposite rotational displacement thereof.

2. A flow-control device adapted for use in bung-openings of barrels, drums, tanks or the like, comprising a generally cup-like plug member adapted to be secured in a bung-hole with its end-wall extending outwardly, a base plate secured to said end-wall and having its peripheral zone clear of said plug member, a socket ring surrounding said base plate and pivotally related thereto and having an inturned locking flange extending behind the peripheral portion of the base plate and being confined between said peripheral portion and a portion of the plug member against axial displacement, a passageway through said end-wall and through said base plate, a shut-off disc within said socket ring pivotally secured to said base plate and having connection with said socket ring to cause it to turn in unison therewith, said shut-off disc being adapted to open and close the aforesaid passageway by opposite rotational displacement thereof, and a sealing gasket intermediate said base plate and said shut-off disc.

3. A flow-control device adapted for use in bung-openings of barrels, drums, tanks or the like, comprising a pressed-steel cup-like plug member having a generally cylindrical portion open at one end and adapted to have its open end secured in a bung-hole and having a terminal wall at the outer end thereof, a trunnion-like portion surrounding said terminal wall, an eccentric opening through said terminal wall, a base plate of a diameter slightly larger than said trunnion-like portion and having a corresponding eccentric opening therethrough and a generally tubular grommet-like sealing bushing drawn from said base plate around the opening thereof and extending through the opening in said terminal wall and being flared and crimped outwardly tightly around the periphery of said base plate opening to form a fluid-tight seal therewith, said base plate being spot-welded to said terminal wall, a socket ring surrounding said base plate and pivotally related thereto and having an inturned flange extending around the free peripheral portion of said base plate, a shut-off disc within said socket-ring having a central pivot opening and having an eccentric port opening corresponding to the aforementioned openings, a flanged pivot member extending through said pivot opening and spot-welded to said base plate, thereby to retain the shut-off disc within the socket in pivotal relation to the base plate, and means interlocking the shut-off disc and socket ring to cause it to rotate in unison.

4. A flow-control coupling device adapted for use in the bung-openings of barrels, drums, tanks, or the like, comprising a generally tubular base member adapted to be secured in a bung hole and having an outer end-wall transversely of its axis, a port hole in said end-wall, an internally screw-threaded co-axial socket pivotally secured to said base member, a rotatable shut-off disk having a port hole therein adapted to be brought into and out of registration with the port hole in the aforesaid end-wall by rotary motions of said socket and shut-off disk; said shut-off disk being interlocked with said socket against relative rotational displacement between the two, but being capable of axial displacement relative to the socket, whereby said shut-off disk may be displaced in the direction of the aforesaid ported end-wall in relation to said socket by any coupling member or closure member screw-threaded into said socket, thereby to intensify the fluid-seal between the aforesaid end-wall and said shut-off disk by the pressure exerted by said coupling member or closure member screw-threadedly advanced into the socket.

5. A flow-control coupling device adapted for use in the bung-openings of barrels, drums, tanks, or the like, comprising a generally tubular base member adapted to be secured in a bung hole and having an outer end-wall transversally of its axis, a port hole in said end-wall, an internally screw-threaded co-axial socket pivotally secured to said base member, a rotatable shut-off disk having a port hole therein adapted to be brought into and out of registration with the port hole in the aforesaid end-wall by rotary motions of said socket and shut-off disk; said shut-off disk being interlocked with said socket against relative rotational displacement between the two, but being capable of axial displacement relative to the socket, whereby said shut-off disk may be displaced in the direction of the aforesaid ported end-wall in relation to said socket by any coupling member or closure member screw-threaded into said socket, thereby to intensify the fluid-seal between the aforesaid end-wall and said shut-off disk by the pressure exerted by said coupling member or closure member screw-threadedly advanced into the socket and a sealing gasket intermediate said ported end-wall and said ported shut-off disk, adapted to be compressed whenever a coupling member or closure member is screw-threaded into said socket.

EDWIN P. SUNDHOLM.